(12) United States Patent
Garza et al.

(10) Patent No.: US 11,742,793 B2
(45) Date of Patent: Aug. 29, 2023

(54) CLAMP ASSEMBLY

(71) Applicants: David G. Garza, Plano, TX (US); Horacio Duhart, Plano, TX (US)

(72) Inventors: David G. Garza, Plano, TX (US); Horacio Duhart, Plano, TX (US)

(*) Notice: Subject to any disclaimer, the term of this patent is extended or adjusted under 35 U.S.C. 154(b) by 0 days.

(21) Appl. No.: 17/522,822

(22) Filed: Nov. 9, 2021

(65) Prior Publication Data

US 2023/0122241 A1 Apr. 20, 2023

Related U.S. Application Data

(60) Provisional application No. 63/256,526, filed on Oct. 15, 2021.

(51) Int. Cl.

| F16B 2/06 | (2006.01) |
|---|---|
| F16M 13/00 | (2006.01) |
| E04D 13/00 | (2006.01) |
| E04D 3/00 | (2006.01) |
| F16M 13/02 | (2006.01) |
| E04D 3/361 | (2006.01) |
| E04D 3/362 | (2006.01) |

(52) U.S. Cl.
CPC ............ *F16B 2/065* (2013.01); *F16M 13/022* (2013.01); *E04D 3/00* (2013.01); *E04D 3/361* (2013.01); *E04D 3/362* (2013.01); *E04D 13/00* (2013.01)

(58) Field of Classification Search
CPC ....... F16B 2/065; F16B 5/126; F16M 13/022; E04D 13/06; E04D 13/00; E04D 3/00; E04D 3/361; E04D 3/362; H02S 20/23
See application file for complete search history.

(56) References Cited

U.S. PATENT DOCUMENTS

| 6,536,166 | B1* | 3/2003 | Alley | E04D 13/10 |
| | | | | 52/24 |
| 8,627,617 | B2* | 1/2014 | Haddock | H02S 20/23 |
| | | | | 52/173.3 |
| 11,041,310 | B1* | 6/2021 | Haddock | E04D 3/30 |
| 2007/0051053 | A1* | 3/2007 | Hockman | E04D 13/10 |
| | | | | 52/25 |
| 2016/0177984 | A1* | 6/2016 | Kovacs | B25B 5/101 |
| | | | | 361/825 |
| 2018/0128295 | A1* | 5/2018 | Haddock | E04D 3/361 |

\* cited by examiner

*Primary Examiner* — Tan Le
(74) *Attorney, Agent, or Firm* — Thrasher Associates

(57) ABSTRACT

The present invention relates to a clamp assembly for securing a variety of equipment. The clamp assembly comprises a top portion, a bottom portion, a first side and a second side. The top portion comprises a first surface and a second surface separated by a first channel that is configured to receive an accessory. The bottom portion has a cavity for mounting the clamp assembly on a structure. The first side comprises a first securing hole and a second securing hole, each configured to receive a first securing means and a second securing means. The second side comprises a second channel for receiving the accessory and a first blind hole and a second blind hole for securing the first securing means and the second securing means received through the first securing hole and the second securing hole.

12 Claims, 5 Drawing Sheets

CLAMP ASSEMBLY

CLAIM OF PRIORITY, IDENTIFICATION OF RELATED APPLICATIONS

This Non-Provisional Patent Application claims priority from U.S. Provisional Patent Application No. 63/256,526 filed on Oct. 15, 2021 entitled SOLAR PANEL RAIL-AND-CLAMP SYSTEM, to common inventors David G. Garza, et al.

TECHNICAL FIELD

The present invention generally relates to clamp assembly. More specifically, the present invention relates to clamp assembly for securing a variety of equipment in the solar industry.

PROBLEM STATEMENT AND HISTORY

Interpretation Considerations

This section describes technical field in detail and discusses problems encountered in the technical field. Therefore, statements in the section are not to be construed as prior art.

DISCUSSION OF HISTORY OF THE PROBLEM

Seam roofs are generally found in commercial and residential applications. Mounting equipment, such as solar (photovoltaic) modules, for example, to standing seam roofs may pose challenges as there are variations in seam peak shape and seam pitch. Non-limiting examples of the standing seam roofs include L-shaped standing seam roofs, and I-shaped standing metal roofs of various heights and thicknesses.

Due to the wide variation of available seam shapes, heights, and thicknesses, some manufacturers offer clamp types for each seam shape. Even a minor modification to a standing seam roof may require a new clamp type, resulting in increased cost for manufacturers as well as end-users. However, existing clamp assemblies are application specific. Accordingly, there exist a need for a clamp assembly that can be adapted to install and work with a variety of seam roof types (and similar structures) without having to utilize multiple different clamp assemblies. The present invention provides such a solution.

SUMMARY

The present invention relates to a clamp assembly for securing a variety of equipment. The clamp assembly comprises a top portion, a bottom portion, a first side, a second side and defined by a length. The top portion comprises a first surface and a second surface separated by a first channel. The first channel is configured to receive an accessory and is formed in a longitudinal direction of the clamp assembly. The bottom portion has a cavity for mounting the clamp assembly on a structure. The cavity has an inverted-L shape, thereby allowing the clamp assembly to be mounted on the structure, where a first securing means and a second securing means secure the clamp assembly to the structure. The first side comprises a first securing hole and a second securing hole, each configured to receive the first securing means and the second securing means.

The second side comprises a second channel for receiving the accessory. The second side further comprises a first blind hole and a second blind hole for securing the first securing means and the second securing means received through the first securing hole and the second securing hole. The first blind hole and the second blind hole are concentric to the first securing hole and the second securing hole respectively.

The first surface and the second surface are a grooved surface that increase friction between solar panels and the clamp assembly. Each of the first surface and the second surface functions as a base for directly mounting the solar panels in rail-less systems. Alternatively, each of the first surface and the second surface functions as the base to support the accessory when using the clamp assembly for an installation with rails.

Of course, the present is simply a Summary, and not a complete description of the invention.

BRIEF DESCRIPTION OF THE DRAWINGS

Various aspects of the invention and its embodiment are better understood by referring to the following detailed description. To understand the invention, the detailed description should be read in conjunction with the drawings.

DESCRIPTION OF AN EXEMPLARY PREFERRED EMBODIMENT

Interpretation Considerations

While reading this section (Description of An Exemplary Preferred Embodiment, which describes the exemplary embodiment of the best mode of the invention, hereinafter referred to as "exemplary embodiment"), one should consider the exemplary embodiment as the best mode for practicing the invention during filing of the patent in accordance with the inventor's belief. As a person with ordinary skills in the art may recognize substantially equivalent structures or substantially equivalent acts to achieve the same results in the same manner, or in a dissimilar manner, the exemplary embodiment should not be interpreted as limiting the invention to one embodiment.

The discussion of a species (or a specific item) invokes the genus (the class of items) to which the species belongs as well as related species in this genus. Similarly, the recitation of a genus invokes the species known in the art. Furthermore, as technology develops, numerous additional alternatives to achieve an aspect of the invention may arise. Such advances are incorporated within their respective genus and should be recognized as being functionally equivalent or structurally equivalent to the aspect shown or described.

A function or an act should be interpreted as incorporating all modes of performing the function or act, unless otherwise explicitly stated. For instance, sheet drying may be performed through dry or wet heat application, or by using microwaves. Therefore, the use of the word "paper drying" invokes "dry heating" or "wet heating" and all other modes of this word and similar words such as "pressure heating".

Unless explicitly stated otherwise, conjunctive words (such as "or", "and", "including", or "comprising") should be interpreted in the inclusive and not the exclusive sense.

As will be understood by those of the ordinary skill in the art, various structures and devices are depicted in the block diagram to not obscure the invention. In the following discussion, acts with similar names are performed in similar manners, unless otherwise stated.

The foregoing discussions and definitions are provided for clarification purposes and are not limiting. Words and phrases are to be accorded their ordinary, plain meaning, unless indicated otherwise.

Description of the Drawings, a Preferred Embodiment

The present invention generally relates to a clamp assembly. One of the advantages of the disclosed clamp assembly is that it may be adapted to work with multiple standing seam roof seam shapes without having to obtain a different clamp assembly for each seam shape. Additionally, the clamp assembly can also be adapted to support rail-based as well as rail-less systems.

Figure 1:
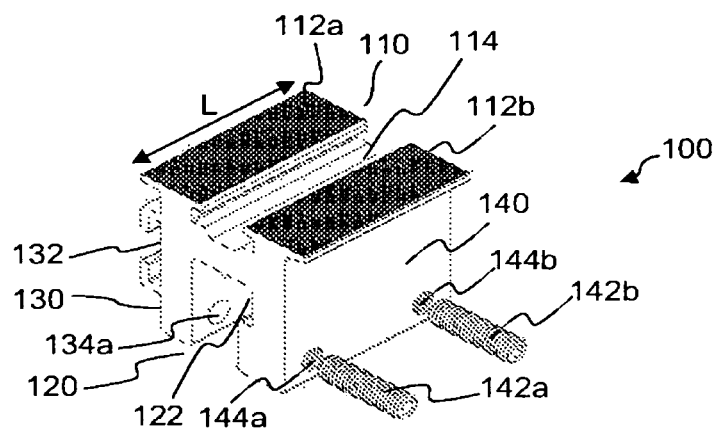
FIG. 1 illustrates an exploded perspective view of a clamp assembly.
Figure 2:
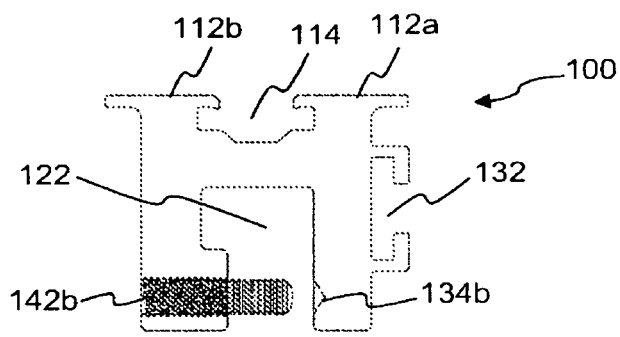
FIG. 2 is a front view of the clamp assembly taken across cut-line A-A of FIG. 3.
Figure 3:
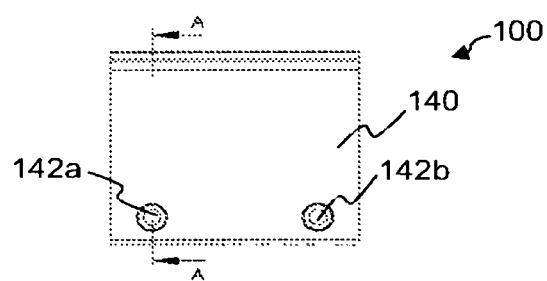
FIG. 3 is a left-side view the clamp assembly.
Figure 4:
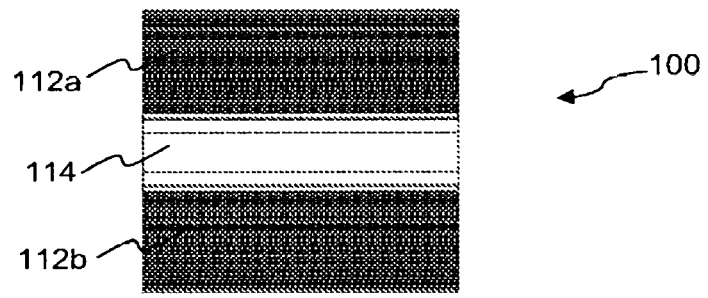
FIG. 4 is a top view the clamp assembly.
Figure 5:
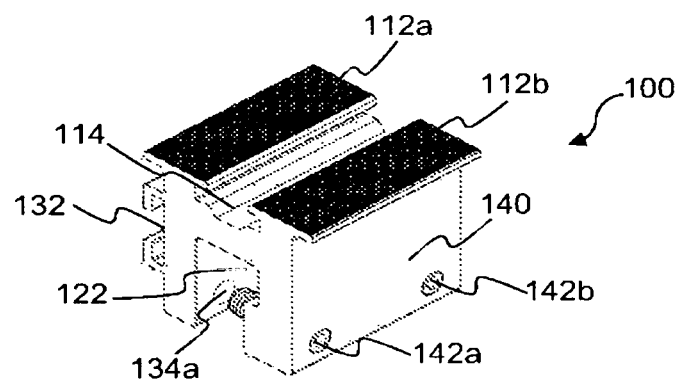
FIG. 5 illustrates a perspective view of the clamp assembly.

In opening, simultaneous reference is made to FIGS. 1 through 5, in which FIG. 1 illustrates an exploded perspective view of the clamp assembly 100, FIG. 2 is a front view of the clamp assembly 100, FIG. 3 is a left-side view the clamp assembly 100, FIG. 4 is a top view the clamp assembly 100, and FIG. 5 illustrates a perspective view of the clamp assembly 100.

The clamp assembly (also referred to as simply a "clamp") 100 is a seam clamp for securing equipment, such as photovoltaic (PV) solar modules to roofs or metal roofs with standing seam, for example. The clamp assembly 100 is a solid piece of a metal or a combination of metals, such as aluminum or steel, for example with a special design to anchor different accessories to mount and secure the PV solar modules or other equipment such as snow guards, fall protection, HVAC (Heating, Ventilation, and Air Conditioning) or split systems, walkways, pipes and conduit, advertising signs, equipment screens, satellite dishes, cameras, lighting protection systems, and other devices to a standing seam metal roof. Accordingly, the clamp assembly 100 is configured to accommodate different forms of standing seams.

The clamp assembly 100 has a top portion 110, a bottom portion 120, a first side 140 and a second side 130. Further, the clamp assembly has a length L. The length L of the clamp assembly 100 may be centimeters, inches, meters, or feet in length.

The top portion 110 comprises a first surface 112a and a second surface 112b, where the first and second surface are separated by a first channel 114. In an embodiment, the first surface 112a and the second surface 112b have a grooved surface shape to increase friction between PV solar modules (a/k/a solar panels, not shown) and the clamp assembly 100 when installed.

In an implementation, each of the first surface 112a and the second surface 112b functions as a base for directly mounting the solar panels in rail-less systems. In an alternate implementation, each of the first surface 112a and the second surface 112b functions as the base to support an accessory when using the clamp assembly 100 for an installation with rails.

Figure 7:
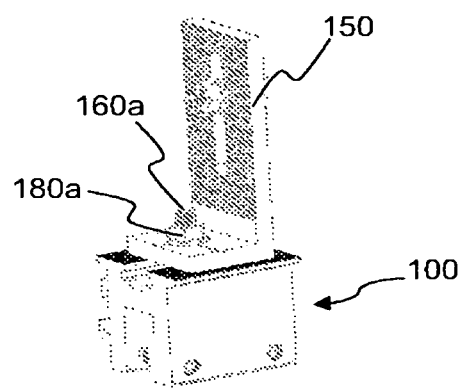
FIG. 7 shows a clamp assembly with a second accessory.

The first channel 114 exists the length L of the clamp assembly and is configured to receive an accessory (shown in FIG. 7). The accessory may be a universal clamp in end-clamp or mid clamp mode, any type of bolt (t-bolt, for example), a cable management clip, a grounding terminal, for example. In an embodiment of the present invention, the first channel 114 located at the top portion 110 of the clamp assembly 100 is designed for receiving a universal clamp for the PV solar modules and for securing the PV solar modules to the first surface 112a and the second surface 112b.

As seen in FIG. 2, the first channel 114 has a cut-profile of a cross that has a vertical channel portion and a horizontal channel portion. The vertical channel portion extends in the direction of the bottom portion 120, which the horizontal portion extends underneath each of the first surface 112a and second surface 112b. In one embodiment, the vertical portion and the horizontal portion of the first channel 114 cut-profile have dimensions that accommodate a bolt-head securely under the first surface 112a and the second surface 112b. The first channel 114 may have any other suitable shape capable of receiving one or more desired accessories.

Figure 9:
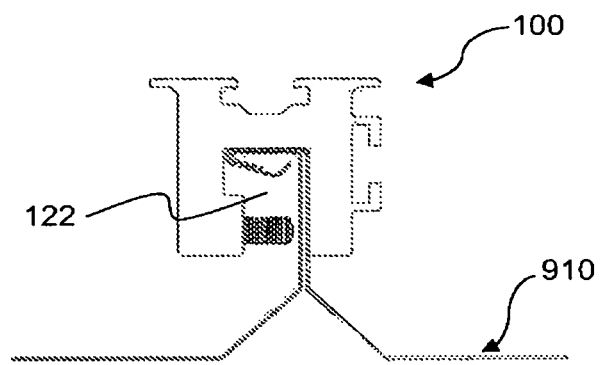
FIG. 9 illustrates the clamp assembly with a first alternative structure.
Figure 10:
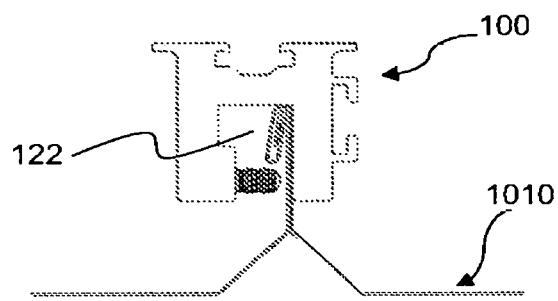
FIG. 10 illustrates the clamp assembly with a second alternative structure.

The bottom portion 120 has a cavity 122 for mounting the clamp assembly 100 on a structure such as the structures 910 and 1010 (shown in FIG. 9 and FIG. 10, respectively). As seen in FIG. 2, the cavity 122 has a cut-profile having an inverted-L shape, thereby allowing the clamp assembly 100 to be mounted on each of the structures 910 and 1010.

The first side 140 comprises a first securing hole 144a and a second securing hole 144b, each configured to receive a first securing means 142a and a second securing means 142b respectively. The first securing hole 144a and the second securing hole 144b may be a threaded hole. The first securing means 142a and the second securing means 142b secure the clamp assembly 100 to a structure such as the structures 910 and 1010, and each may be embodied as a bolt, rivet, screw, or set screw, for example. In an embodiment each securing means 142a, 142b terminate with a semi-hemispherical (or rounded) end.

The second side 130 comprises a second channel 132, a first blind hole 134a and a second blind hole 134b, which are each in an embodiment hemispherical (rounded) and/or shallow. The second channel 132 is formed on an outer surface of the second side 130 and the first blind hole 134a and the second blind hole 134b are formed on an inner surface of the second side 130.

The second channel 132 is configured for receiving the accessory. The accessory may be a universal clamp in end-clamp or mid clamp mode, any type of bolt, a cable management clip, a grounding terminal, for example. As is viewable in FIG. 2, the second channel 132 is a C-shaped lateral channel formed by two L-shaped structures coupled to the second side 130. The second channel 132 may have any other suitable shape capable of receiving a desired accessory.

In use, the first blind hole 134a and the second blind hole 134b secure the first securing means 142a and the second securing means 142b received through the first securing hole 144a and the second securing hole 144b. The first blind hole 134a and the second blind hole 134b are concentric to the first securing hole 144a and the second securing hole 144b respectively. The first blind hole 134a and the second blind hole 134b deform the structure 910 and 1010 when pressed against the first securing means 142a and the second securing means 142b.

Advantageously, the clamp assembly 100 can be adapted to directly mount the PV solar modules by engaging the PV solar modules against the top portion 110 of the clamp assembly 100 and can align the PV solar modules in a desired orientation with respect to the structure 910 and 1010.

Figure 6:
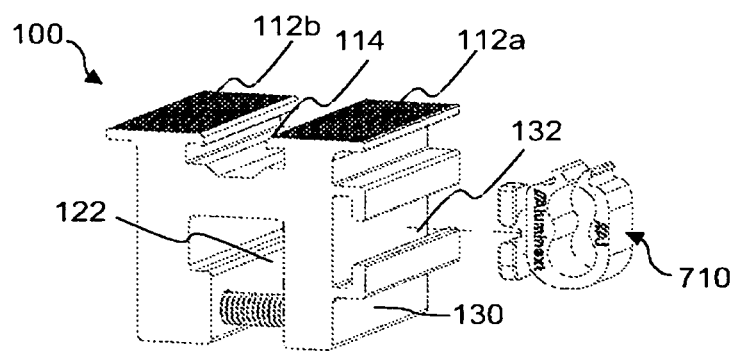
FIG. 6 shows a clamp assembly with a first accessory.
Figure 8:
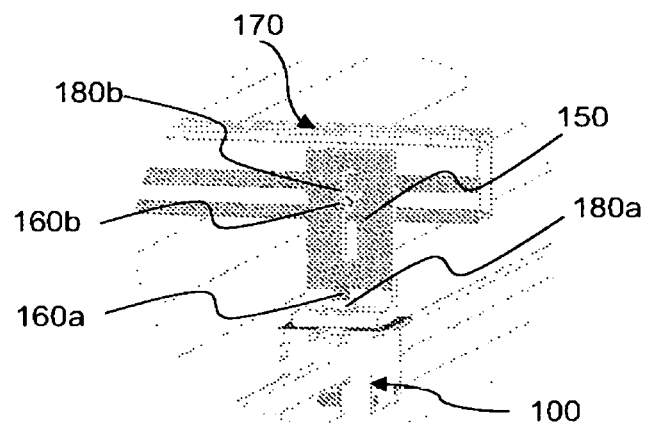
FIG. 8 illustrates the clamp assembly securing a rail.

FIG. 6 and FIG. 7 show a clamp assembly accommodating accessories, while FIG. 8 illustrates a clamp assembly securing a rail or beam. The following discussion makes simultaneous reference to FIGS. 1-8.

Now referring to FIG. 6, the second channel 132 is designed to receive a second accessory 710. Here, the second accessory is a cable management clip. For purposes of this discussion and to avoid ambiguity, the L-bracket has been considered as the first accessory 150 and the cable management clip has been considered as the second accessory 710, however in various embodiments, the first accessory 150 and the second accessory 710 may be same structural thing, and nor must there be a plurality of accessories. The first accessory 150 and the second accessory 710 may be a universal clamp in end-clamp or mid clamp mode, any type of bolt, a cable management clip, a grounding terminal or any other combination, for example, and a wide variety of accessories are readily apparent to those of ordinary skill in the solar arts upon reading this disclosure.

Referring to FIG. 7, the top portion 110 of the clamp assembly 100 is secured to a first accessory 150 here illustrated as an L-bracket. A bottom portion of the L-bracket is mounted to the top portion 110 of the clamp assembly 100 through a first fastening means (here the threaded end of a bolt) 160a and a first nut 180a. As seen in FIG. 8, the top portion of the first accessory 150 is engaged with a rail or beam 170 through a second fastening means (such as a bolt) 160b and a second nut 180b. The first fastening means 160a and the second fastening means 160b may be a threaded bolt, threaded t-bolt, simple bolt, flanged bolt or any other suitable fastening means or functionally equivalent structure. The first nut 180a and the second nut 180b may be a flanged nut or any other suitable type of nut known in the art, or any functionally equivalent structure.

Now, referring to FIG. 9 and FIG. 10, which illustrate the clamp assembly 100 secured to structure 910 and 1010, respectively. In one embodiment, the structure is a standing seam roof, for example secured into the cavity 122. Referring to FIG. 9, the standing seam roof may be a 90° standing seam roof 910, or as shown in FIG. 10, the standing seam roof may be a 180° standing seam roof 1010. Of course, other seam roof types are known, foreseeable, and unforeseeable, and each of these is readily apparent to those of skill in the solar arts upon reading this disclosure.

Although the invention has been described and illustrated with specific illustrative embodiments, it is not intended that the invention be limited to those illustrative embodiments. Those skilled in the art will recognize that variations and modifications can be made without departing from the spirit of the invention. Therefore, it is intended to include within the invention, all such variations and departures that fall within the scope of the appended claims and equivalents thereof.

TABLE

LIST OF REFERENCE NUMERALS

| Reference Numeral | Element Name |
| --- | --- |
| 100 | Clamp assembly |
| 110 | Top portion |
| 120 | Bottom portion |
| 140 | First side |
| 130 | Second side |
| 112a, 112b | First surface, Second surface |
| 114 | First channel |
| 122 | Cavity |

TABLE-continued

LIST OF REFERENCE NUMERALS

| Reference Numeral | Element Name |
| --- | --- |
| 132 | Second channel |
| 134a, 134b | First blind hole, Second blind hole |
| 142a, 142b | First securing means, Second securing means |
| 144a, 144b | First securing hole, Second securing hole |
| 150 | First accessory |
| 160a, 160b | First fastening means, Second fastening means |
| 170 | Rail |
| 180a, 180b | First nut, Second nut |
| 710 | Second accessory |
| 910, 1010 | Structure |

What is claimed is:

1. A clamp assembly, comprising:
a top portion comprising a first surface and a second surface separated by a first channel, the first channel is configured to receive an accessory;
a bottom portion having a cavity for mounting the clamp assembly on a structure, wherein the cavity has an inverted-L shape, thereby allowing the clamp assembly to be mounted on the structure;
a first side comprising a first securing hole and a second securing hole, each configured to receive a first securing means and a second securing means; and
a second side comprising:
a second channel for receiving the accessory, wherein the second channel is a lateral channel; and
a first blind hole and a second blind hole for securing the first securing means and the second securing means received through the first securing hole and the second securing hole, the first blind hole and the second blind hole being concentric to the first securing hole and the second securing hole respectively.

2. The clamp assembly of claim 1 comprises a length L of at least two inches.

3. The clamp assembly of claim 1 wherein the first channel is formed in a longitudinal direction.

4. The clamp assembly of claim 1 wherein the first surface and the second surface are a grooved surface that increase friction between solar panels and the clamp assembly.

5. The clamp assembly of claim 1 wherein each of the first surface and the second surface functions as a base for directly mounting the solar panels in rail-less systems.

6. The clamp assembly of claim 1 wherein each of the first surface and the second surface functions as the base to support the accessory when using the clamp assembly for an installation with rails.

7. The clamp assembly of claim 1 wherein the second channel is a C-shaped lateral channel formed when two L-shaped structures are coupled with the second side.

8. The clamp assembly of claim 1 wherein the first securing means and the second securing means secure the clamp assembly to the structure.

9. The clamp assembly of claim 1 wherein the first blind hole and the second blind hole deform the structure when being pressed against the first securing means and the second securing means.

10. The clamp assembly of claim 1 wherein the first securing means and the second securing means have a rounded point.

11. The clamp assembly of claim 1 wherein the first securing hole and the second securing hole receive the first securing means and the second securing means respectively to secure the clamp assembly to the structure.

12. The clamp assembly of claim 1 wherein the second channel is formed on an outer surface of the second side and the first blind hole and the second blind hole are formed on an inner surface of the second side.

* * * * *